US006965571B2

(12) United States Patent
Webber

(10) Patent No.: US 6,965,571 B2
(45) Date of Patent: Nov. 15, 2005

(54) PRECISE ERROR REPORTING

(75) Inventor: Thomas P. Webber, Petersham, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 912 days.

(21) Appl. No.: 09/939,973

(22) Filed: Aug. 27, 2001

(65) Prior Publication Data

US 2003/0039209 A1 Feb. 27, 2003

(51) Int. Cl.[7] .......................... G06F 11/00; H04L 1/00; G11C 29/00; H04J 3/14

(52) U.S. Cl. ........................ 370/242; 370/230; 714/18; 714/48; 714/52

(58) Field of Search ................................ 370/230, 252, 370/242; 714/18, 48, 52, 798, 799, 723

(56) References Cited

U.S. PATENT DOCUMENTS 6,591,383 B1 * 7/2003 Michel et al. .............. 714/704

* cited by examiner

*Primary Examiner*—Chi Pham
*Assistant Examiner*—Ronald Abelson
(74) *Attorney, Agent, or Firm*—Park, Vaughan & Fleming LLP

(57) ABSTRACT

A method is provided for the precise reporting of errors in a flow of successive messages. The method includes detecting a transmission error in a message and then deferring the reporting of the transmission error. The method defers the reporting of the transmission error by saving a sequence number for the message and by setting a deferred error flag in a state saved for the flow. The method processes the deferred transmission error when it receives an acknowledgement that completes an immediately preceding message in the flow. When a positive acknowledgement is received, the deferred transmission error is reported. When a negative acknowledgement is received, the deferred transmission error is ignored and a remote error is reported.

16 Claims, 6 Drawing Sheets

PRECISE ERROR REPORTING

TECHNICAL FIELD

The present invention relates in general to data communications, and in particular, to the precise reporting of errors in a data communication sequence.

BACKGROUND ART

In many communication networks, data is exchanged as a series of messages, commonly referred to as a communication sequence or flow. Each message in the flow is divided into one or more packets, which are typically sent from one network device to another. Packets are numbered so that they can be reassembled into messages once delivered to a receiving network device. To preserve data integrity, a sending network device checks the outgoing data for errors. A single network device can support thousands of flows. When an error is detected in a flow, the sending network device notifies software and stops transmitting further packets in that flow.

A common mechanism (or protocol) used for managing message flows is the InfiniBand™ standard (the specification of which is incorporated herein by reference). In accordance with this protocol, a transmitting device (a requester) sequentially transmits a flow of messages containing one or more packets to a receiving device (a responder). The responder receives the message packets in the flow, detects errors, and sequentially reports the status of each of the received packets back to the requester. Once the responder reports a remote error to the requester, the responder will not accept any more packets in that flow. Errors reported by the responder are called remote errors because they are detected remotely from the requester. Once the requester receives a report of a packet containing a remote error the error is reported to software in a completion code and any subsequent reports for the flow from the responder are ignored.

While preparing to transmit a flow to the responder, the requester may detect transmission errors. Transmission errors may be detected after packets earlier in the flow sequence have been sent to the responder. Conventionally, when the requester detects a transmission error in a packet, it is immediately reported to software so that the flow can be promptly terminated. InfiniBand™ specifies that the requester must immediately report all errors that it detects.

SUMMARY OF THE INVENTION

A method for the precise reporting of errors in a flow of successive messages containing at least one packet. The method includes detecting a transmission error in the packet and then deferring the reporting of the transmission error. The method defers the reporting of the transmission error by saving a sequence number of the packet and setting a deferred error flag in a state saved for the flow. The method processes the deferred transmission error when it receives an acknowledgement pertinent to an immediately preceding message in the flow. In one embodiment, the deferred transmission error is reported when a positive acknowledgement is received. In another embodiment, the deferred transmission error is ignored and a remote error is reported when a negative acknowledgement is received.

A state machine is provided for tracking the status of packets in a flow of successive messages from a requester. The state machine includes an acknowledgement sequence number, a deferred error flag, and a deferred error sequence number. The state machine sets the deferred error flag when the requester detects a transmission error in a packet in a message. In one embodiment, the deferred error flag remains set when the requestor receives a positive acknowledgement of a packet in a message immediately preceding the transmission error. In another embodiment, the state machine terminates when the requester receives a negative acknowledgement of a packet in a message immediately preceding the transmission error.

In accordance with a further method, precise reporting of errors is performed on a flow including a first message and a second message. The method includes transmitting the first message, detecting a transmission error in the second message, and deferring the reporting of the transmission error in the second message. The method defers the reporting of the transmission error in the second message by writing a record of the transmission error to a state saved for the flow. The method further includes processing the deferred transmission error in the second message upon receiving an acknowledgement pertinent to the first message. The method writes a record of the transmission error in the second message to a state by saving a sequence number of the packet causing the error and setting a deferred error flag in the state. In one embodiment, the deferred transmission error in the second message is reported when a positive acknowledgement pertinent to the first message is received. In another embodiment, the deferred transmission error is ignored and a remote error is reported when a negative acknowledgement pertinent to the first message is received.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
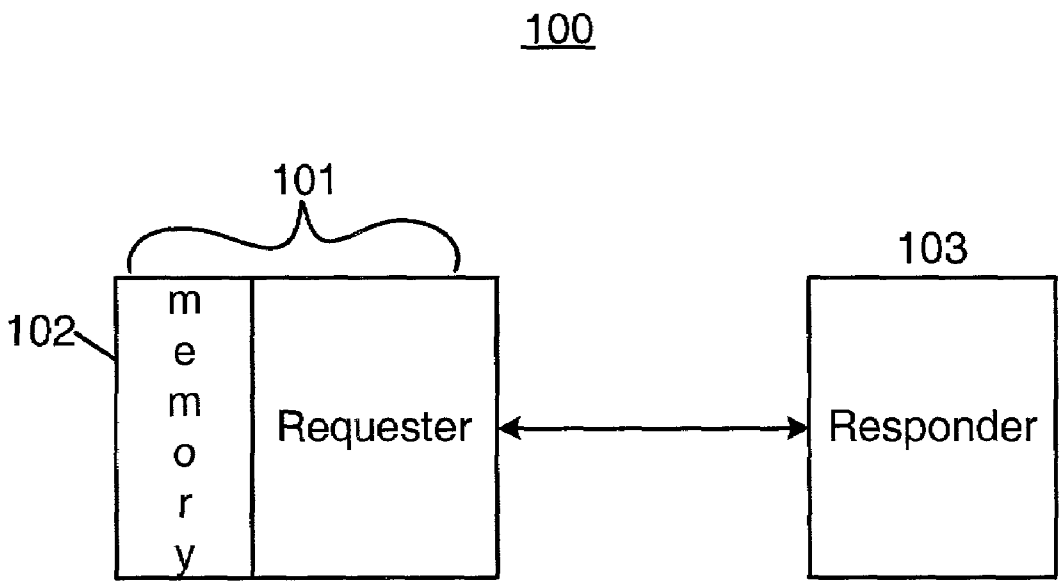
FIG. 1 is a block diagram of a system in which an embodiment of the present invention may be practiced.

FIG. 1 is a block diagram of a system in which an embodiment of the present invention may be practiced. The system 100 is a communications network including a requester 101 and a responder 103. Requester 101 is an "input/output" (IO) hardware device that transmits data packets in a flow. A flow is an ordered series of related data packets sent from one device to another. The responder 103 is the destination device that receives the packets in a flow from the requester 101. Requester 101 also includes a memory 102 from which it reads message descriptors and receives instructions on transmitting data packets in a flow. A descriptor is an instruction that tells the requester hardware what kind of packet(s) to transmit for a message in a flow as well as the number of packets in the message.

Memory 102 may be an error correcting code (ECC) memory device for testing the accuracy of data packets. Each packet passing through memory 102 is marked with an ECC code. When the requester 102 reads data from memory 102 as it prepares to transmit a packet, it verifies the ECC code.

Figure 2:
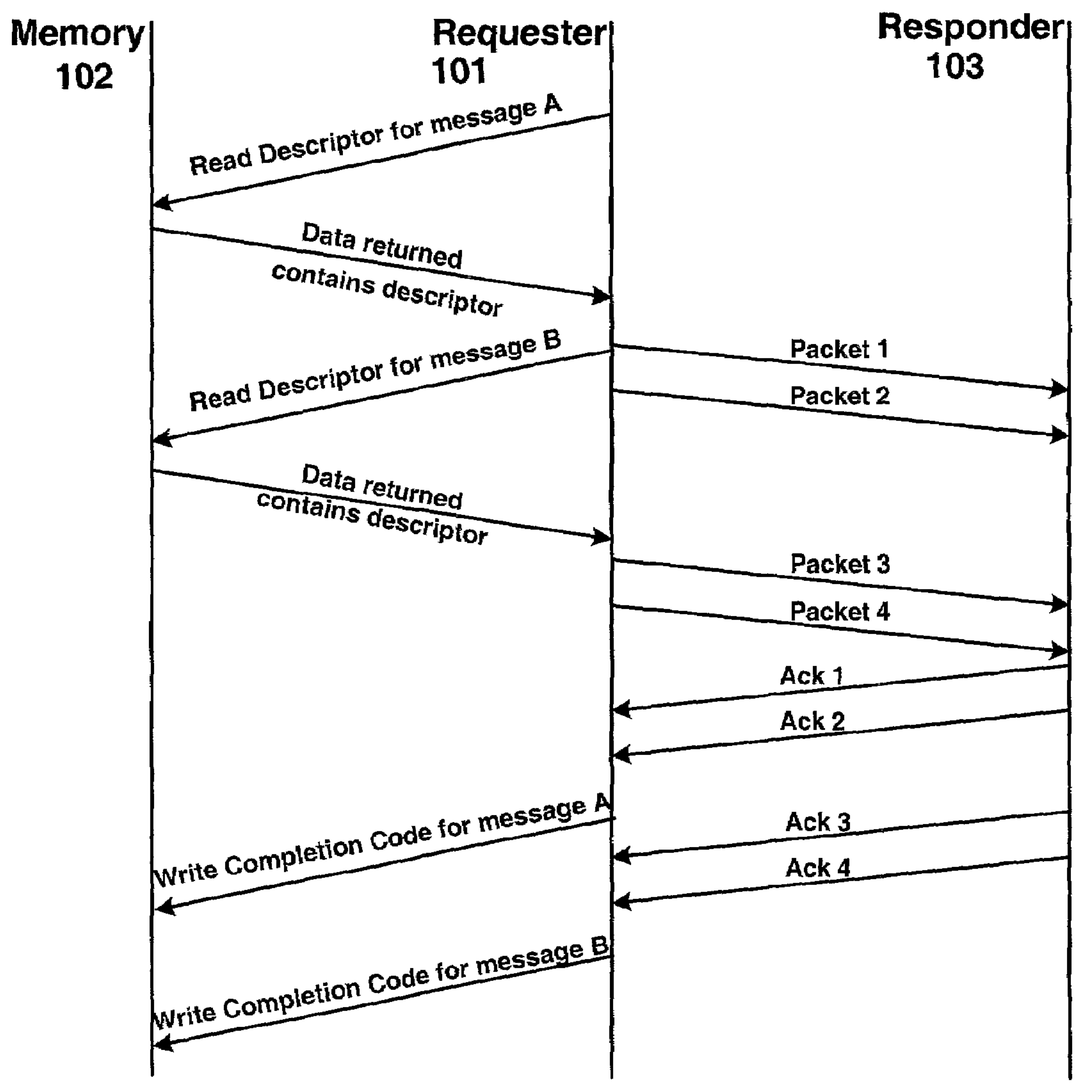
FIG. 2 is a ladder diagram illustrating a message flow in accordance with the prior art.

FIG. 2 is a ladder diagram illustrating a flow's path in accordance with conventional ordered communication protocols, such as Infiniband™. The flow consists of two messages, A and B, with each message containing two packets. Requester 101 reads the descriptors for the messages in the flow from memory 102. Software can write several descriptors to consecutive memory addresses as a list. Knowing the beginning of the list, the requester can service these by reading them one at a time and perform the work of transmitting a packet or packets from a descriptor. Based on the instruction contained in the descriptor, the requester 101 transmits the two packets that make up message A and the two packets that make up message B, to the responder 103. The requester 101 tags (numbers) the packets as they are transmitted (i.e., packet 1, packet 2, etc.) by writing a sequence number in each packet header. Sequence numbers are assigned to each packet to uniquely specify its place in the flow and are typically in an ascending series (i.e., 1, 2, 3, etc.). The responder 103 transmits an acknowledgement back to the requester 102 when it receives a packet, which includes the packet's sequence number. Responder 103 transmits acknowledgements in the order packets are received.

Acknowledgements are positive, negative, or retransmission. A positive acknowledgement indicates that a packet was successfully transmitted from the requester to the responder with no errors. A negative acknowledgement indicates that the responder has detected a remote error in a packet transmitted by the requester. A requester receiving a negative acknowledgement will not accept any more packets in the flow. A retransmission acknowledgement may indicate, for example, that the responder detected a skip in the sequence number of a received packet as compared to an immediately preceding packet in the flow. Upon receiving a retransmission acknowledgement of a transmitted packet, the requester may either retransmit the entire flow from the beginning or retransmit the flow beginning with the skipped packet. If the flow is retransmitted from the beginning, the responder will discard the packets preceding the skipped packet since it has already received them.

Upon receiving an acknowledgement, the requester completes a message by writing a completion code to a list in memory 102 called the Completion Queue (CQ). A message is considered complete when its completion code is written to the CQ. The requester receives an acknowledgement from the responder and determines whether or not the acknowledgement completes the message. Completion codes may be either positive or negative depending on the type of acknowledgement completing a message.

For example, if a positive acknowledgement is received for Packet 1 (Ack 1), the requester must determine that Ack 1 does not complete the descriptor for message A and that Ack 2 does. This determination is made by comparing the sequence number of the last packet in the descriptor for the message with the sequence number of the acknowledgement received for that same message. The requester withholds writing a completion code to the CQ until Ack 2 is received. Once Ack 2 is received, the requester writes a positive completion code to the CQ. If the responder detects a remote error in a packet of a message, it sends a negative acknowledgement to the requester while discarding any subsequent packets in the message. A remote error is an error detected by the requester after a packet has been received. Upon receiving a negative acknowledgement, the requester completes the message in error by writing a negative completion code to the CQ and the message is terminated.

Figure 3:
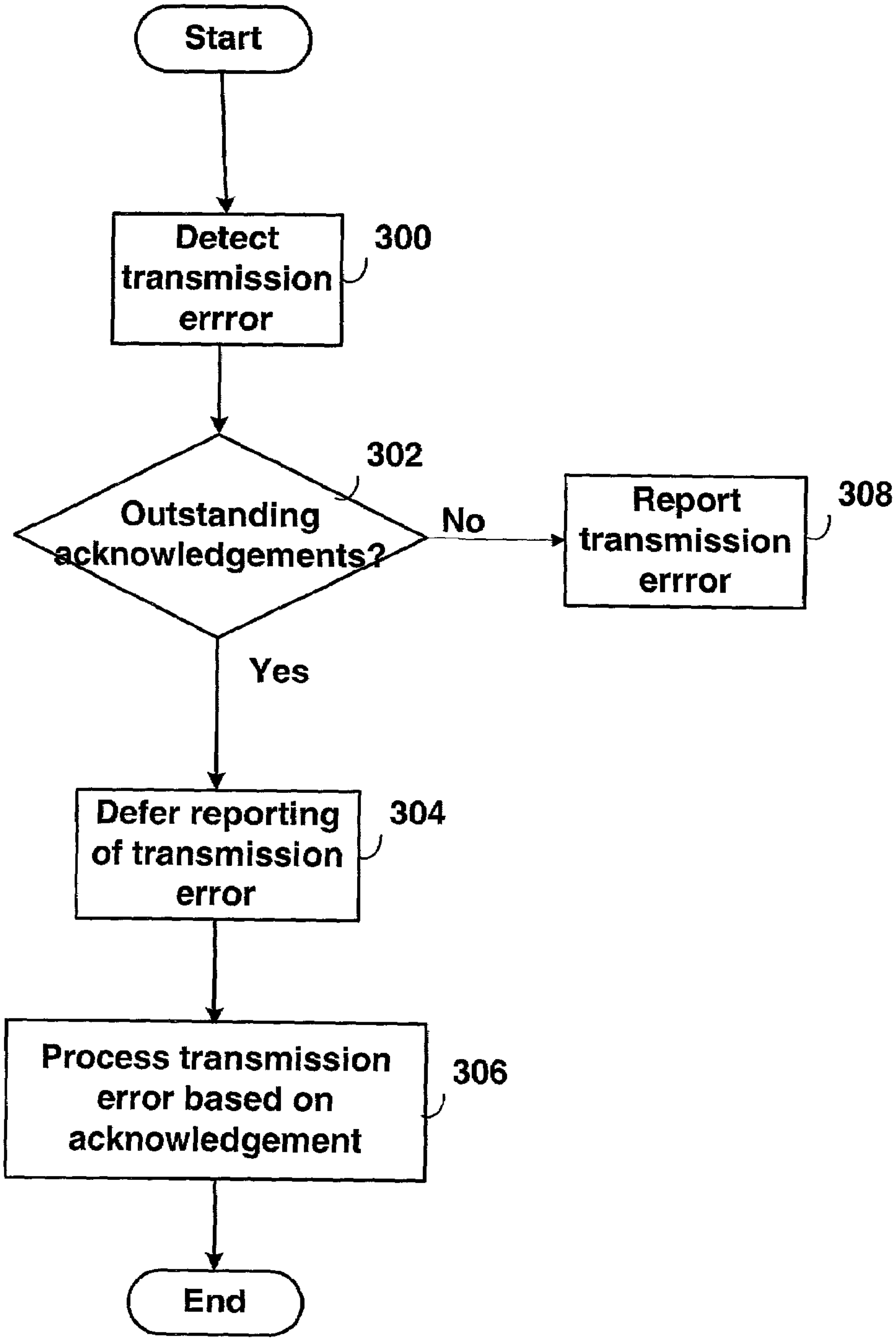
FIG. 3 is a flow chart illustrating the reporting of transmission errors in the message flow illustrated in FIG. 2.

FIG. 3 is a flow chart illustrating an embodiment of the invention for the reporting of transmission errors in a message flow as illustrated in FIG. 2. The process begins when requester 101 detects 300 a transmission error after reading the descriptor from memory 102 for a message in the flow. A transmission error is an error detected by the requester as it is transmitting a packet. The requester 101 detects transmission errors, for example, by checking the ECC code word in the data read from memory 102 as it prepares to send a packet. If an error is detected, that means the data has been corrupted and the packet is discarded. The requester also stops processing any more messages in the flow. The requester 101 then determines if there are outstanding acknowledgements 302 from previously transmitted messages in the flow. If there are no outstanding acknowledgements 302, the requester 101 reports 308 the error to software. Conversely, if there are outstanding acknowledgements 302, the requester 101 defers 304 reporting the error to software as discussed in further detail below in connection with FIG. 4. The requester 101 then processes 306 the deferred error depending upon the acknowledgements received from the immediately preceding message transmitted in the flow as discussed in further detail below in connection with FIG. 5.

Figure 4:
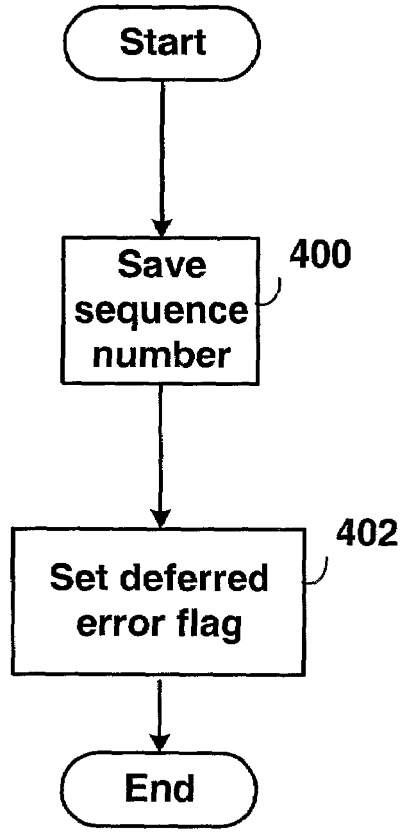
FIG. 4 is a flow chart describing in further detail the deferred reporting of transmission errors illustrated in FIG. 3.

FIG. 4 is a flow chart describing in further detail deferring 304 the reporting of the detected transmission error. When the requester 101 detects a transmission error, it accesses a state in memory 101. A state is a rewriteable memory address stored in memory 102 of the requester 101. Once the state has been accessed, the requester 101 writes a record of the transmission error, which includes a sequence number and a deferred error flag. The requester 101 saves 400 a sequence number from the message containing the deferred error to a state and sets 402 the deferred error flag in the state. The sequence number corresponds to the packet in the message containing the transmission error. The process of saving 400 the sequence number and setting 402 the deferred error flag is discussed in further detail below in connection with FIG. 6.

Figure 5:
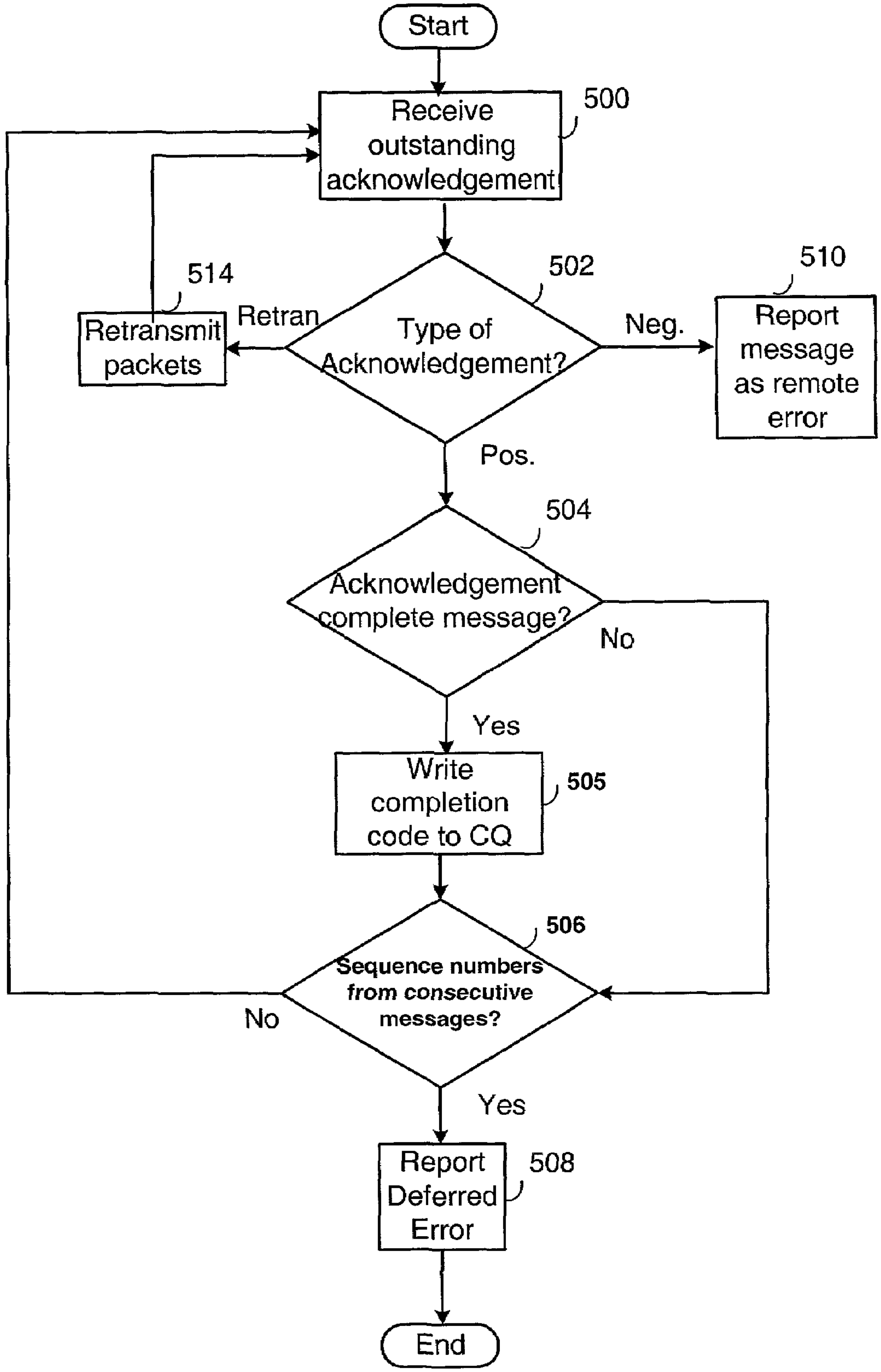
FIG. 5 is a flow chart describing in further detail the processing of deferred errors illustrated in FIG. 3.

FIG. 5 is a flow chart describing in further detail the processing 304 of transmission errors in a flow. As acknowledgements arrive 500 from previously transmitted messages in the flow, the requester 101 determines 502 the type of acknowledgement received. Based on this determination 502, requester 101 appropriately processes the deferred error. If the acknowledgement is positive, the requester 101 determines 504 if the acknowledgement completes the message by looking at its sequence number. If the acknowledgement sequence number does not correspond to the sequence number of the last packet in the message (obtained from the instruction in the descriptor—see FIG. 2), the message is not completed. Conversely, if the sequence number of the acknowledgement corresponds to the sequence number of the last packet in the message 504, the requester 101 completes the message by writing 505 a successful completion code to the CQ. The requester 101 then compares 506 the sequence number of the received acknowledgement (regardless of whether it completed the message) to the saved deferred error sequence number to determine if the acknowledgment came from the message immediately preceding the message that caused the deferred error. If the two sequence numbers are from consecutive messages (e.g., the acknowledgment sequence number is one less than the deferred error sequence number), the requester 101 reports 508 the transmission error by writing a completion code to the CQ. If the two sequence numbers are not from consecutive messages, the requester 101 waits to receive 500 another acknowledgement. Thus, the transmission error is only reported if the requester 101 receives an acknowledgement from the message immediately preceding the transmission error in the flow.

If the requester 101 determines 502 that the acknowledgement is negative, the responder 103 has detected a remote error in a packet in the immediately preceding message. The message is reported 510 in the completion code to the CQ as containing a remote error and the flow is terminated.

If the requester 101 determines 502 that the acknowledgement is a retransmission (e.g., because of a skip in the packet sequence for the message), the requester 101 retransmits 514 the flow, from the beginning. Alternatively, the requester 101 may also retransmit the flow beginning with the skipped packet since the responder 103 will automatically discard duplicates of packets it has already received. After the retransmission, the deferred error flag remains set. However, if during retransmission the requester 101 detects a transmission error in a retransmission packet, the error flag for the previously deferred error is cleared and a new deferred error flag is set for the retransmission packet since the transmission error occurred earlier in the packet sequence for the flow.

In summary, a requester detects a transmission error in a packet in a flow of messages. If there are no outstanding acknowledgements from any previously transmitted packets in the flow, the transmission error is immediately reported. If there are outstanding acknowledgements, the requester defers reporting the error by setting a deferred error flag and by assigning it a deferred error sequence number, while waiting for the outstanding acknowledgements. If the outstanding acknowledgement is positive and completes a message, the requester writes the completion code for the message to software and processes any remaining outstanding acknowledgements. If the positive acknowledgement has a sequence number immediately preceding the deferred error sequence number, such that no more acknowledgements are outstanding, the transmission error is reported. If the outstanding acknowledgement is negative, indicating the detection of a remote error, the remote error is immediately reported. The deferred transmission error is ignored since only the first error in the flow is of interest. If the outstanding acknowledgement is a retransmission, the requester retransmits the packet sequence and waits for a positive acknowledgement that completes the immediately preceding message or a negative acknowledgement. If the requester detects a transmission error during retransmission, the previously deferred error is erased and the earlier occurring transmission error is deferred. Thus, the requester reports errors on outstanding packets, if any, before it reports the transmission error on the packet it detected earlier in time, but not earlier in the sequence.

The software benefits from precise error reporting. When an error is reported to software, it is assured that all messages prior to the message that is in error were successfully transmitted and received. Errors are thus reported in sequence regardless of whether the error was detected remotely upon being received by the responder or detected by the requester before transmission to the responder.

Figure 6:
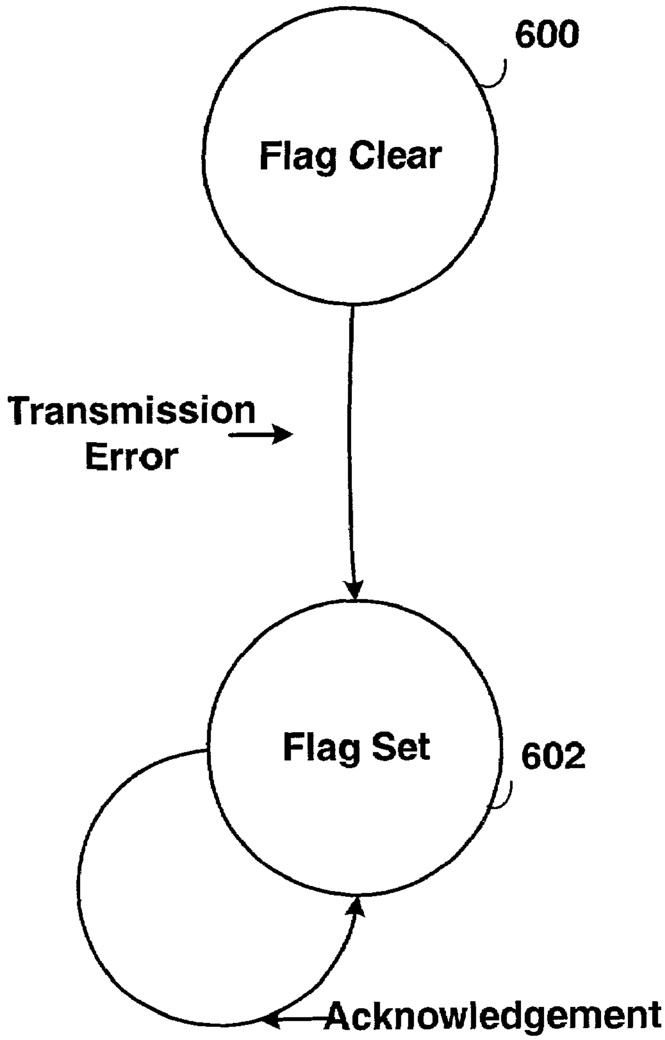
FIG. 6 is a state machine diagram illustrating the setting of the deferred error flag in accordance with FIGS. 4–5.

FIG. 6 is a state machine diagram illustrating the setting and clearing of the deferred error flag in accordance with FIGS. 4–5. When the requester 101 detects a transmission error in a message in the flow, the deferred error flag is switched from a "cleared" state 600 to a "set" state 602. The deferred error flag will remain "set" to indicate the transmission error. When the requester 101 receives a positive acknowledgement from the message immediately preceding the transmission error, the transmission error is reported in the completion code. When the requester 101 receives a negative acknowledgement from any message preceding the transmission error, the remote error is reported and the transmission error is ignored. When the requester 101 receives a retransmission acknowledgement from the message immediately preceding the transmission error, the deferred error flag remains set as the message is retransmitted. The transmission error is not reported unless and until a positive acknowledgement is received which completes the immediately preceding message.

Computer program instructions implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form. The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device.

The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

What is claimed is:

1. A method for the precise reporting of errors in a flow of successive messages, the method comprising:

detecting a transmission error in a message in the flow;

setting a deferred error flag in a state for the flow;

saving a sequence number in the state for the flow, for the message having the transmission error; and processing the transmission error upon receiving an acknowledgement pertinent to an immediately preceding message.

2. The method of claim 1, wherein processing the transmission error upon receiving an acknowledgement pertinent to an immediately preceding message comprises reporting the transmission error.

3. The method of claim 2, wherein processing the transmission error upon receiving an acknowledgement pertinent to an immediately preceding message comprises reporting the immediately preceding message as a remote error.

4. The method of claim 2, wherein the acknowledgement is positive.

5. The method of claim 3, wherein the acknowledgement is negative.

6. A state machine for tracking the status of a flow of successive messages from a requestor, comprising:

a deferred error flag; and a deferred error sequence number;

wherein when the requester detects a transmission error in a message:

the deferred error flag is set; and the deferred error sequence number is saved; and wherein the deferred error flag is cleared when the requester receives a positive acknowledgement for a preceding message.

7. The state machine of claim 6, wherein if a retransmission acknowledgement is received, the deferred error flag remains set during retransmission.

8. The state machine of claim 6, wherein if a negative acknowledgement is received, the transmission error is ignored.

9. A method for the precise reporting of errors in a flow, the flow including a first message and a second message, each message including at least one packet, the method comprising:

transmitting the first message;

detecting a transmission error in the second message;

deferring the reporting of the transmission error in the second message; and processing the transmission error in the second message upon receiving an acknowledgement pertinent to the first message;

wherein the deferring includes writing a record of the transmission error in the second message to a state saved for the flow.

10. The method of claim 9, wherein writing a record of the transmission error in the second message to a state saved for the flow comprises:

saving a sequence number of the packet in the state; and setting a deferred error flag in the state.

11. The method of claim 9, wherein processing the transmission error in the second message upon receiving an acknowledgement pertinent to the first message comprises reporting the transmission error.

12. The method of claim 9, wherein processing the transmission error in the second message upon receiving an acknowledgement pertinent to the first message comprises reporting the first message as a remote error.

13. The method of claim 11, wherein the acknowledgement is positive.

14. The method of claim 12, wherein the acknowledgement is negative.

15. A method for reporting errors in a flow of successive messages comprising:

detecting a transmission error in a message in the flow;

deferring reporting of the transmission error; and reporting the transmission error upon receiving a positive acknowledgement that completes a message in the flow that immediately precedes the message having the transmission error.

16. The method of claim 15, wherein deferring reporting of the transmission error comprises:

saving a sequence number for the message causing the transmission error in a state; and setting a deferred error flag in the state.

* * * * *